(12) United States Patent
Williams

(10) Patent No.: US 10,280,311 B2
(45) Date of Patent: May 7, 2019

(54) FUMED SILICA FOR SUPERHYDROPHOBIC, SUPERHYDROPHILIC OR OMNIPHOBIC SURFACES

(71) Applicant: BEHR PROCESS CORPORATION, Santa Ana, CA (US)

(72) Inventor: Gregory Allen Williams, San Clemente, CA (US)

(73) Assignee: Behr Process Corporation, Santa Ana, CA (US)

( * ) Notice: Subject to any disclaimer, the term of this patent is extended or adjusted under 35 U.S.C. 154(b) by 287 days.

(21) Appl. No.: 15/245,566

(22) Filed: Aug. 24, 2016

(65) Prior Publication Data

US 2018/0057692 A1 Mar. 1, 2018

(51) Int. Cl.
| | | |
|---|---|---|
| C09D 5/00 | (2006.01) |
| C09D 7/61 | (2018.01) |
| C09D 7/20 | (2018.01) |
| C09D 7/62 | (2018.01) |
| C08K 9/06 | (2006.01) |
| C08K 3/36 | (2006.01) |

(52) U.S. Cl.
CPC .................. *C09D 5/00* (2013.01); *C09D 7/20* (2018.01); *C09D 7/61* (2018.01); *C09D 7/62* (2018.01); *C08K 3/36* (2013.01); *C08K 9/06* (2013.01)

(58) Field of Classification Search
CPC ... C09D 5/00; C09D 7/20; C09D 7/61; C09D 7/62; C08K 3/36; C08K 9/06
See application file for complete search history.

(56) References Cited

U.S. PATENT DOCUMENTS

| | | | |
|---|---|---|---|
| 7,524,531 B2 | 4/2009 | Axtell, III et al. |
| 8,147,607 B2 | 4/2012 | Baumgart et al. |
| 8,258,206 B2 | 9/2012 | Kanagasabapathy et al. |
| 8,580,027 B1 | 11/2013 | Campos et al. |
| 9,073,782 B2 | 7/2015 | Shmueli et al. |
| 2005/0223945 A1* | 10/2005 | Baumgart .......... C08G 18/6254 106/481 |
| 2005/0282935 A1* | 12/2005 | Christian ............... C09D 5/028 523/212 |
| 2008/0250978 A1 | 10/2008 | Baumgart et al. |
| 2010/0304086 A1 | 12/2010 | Carre et al. |
| 2012/0107558 A1 | 5/2012 | Koval et al. |

* cited by examiner

*Primary Examiner* — Edward J Cain
(74) *Attorney, Agent, or Firm* — Brooks Kushman P.C.

(57) ABSTRACT

A coating composition includes a fumed silica present in an amount from about 2 to 12 weight percent of the total weight of the coating composition, a resin in an amount from about 5 to 10 weight percent of the total weight of the coating composition, and a polar solvent being the balance.

10 Claims, 1 Drawing Sheet

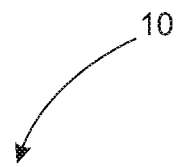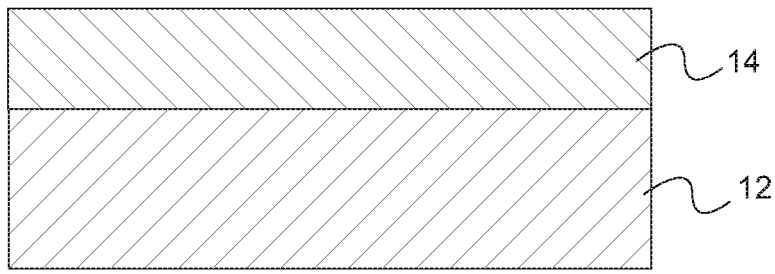

FUMED SILICA FOR SUPERHYDROPHOBIC, SUPERHYDROPHILIC OR OMNIPHOBIC SURFACES

TECHNICAL FIELD

In at least one embodiment, the present invention is related to paint compositions having hydrophobic or omniphobic properties.

BACKGROUND

Paint coatings are ubiquitous finding numerous applications for both aesthetic and functional applications. In many applications, paint coatings are applied to improve the aesthetic appeal of a surface by providing a uniform and pleasing appearance. Unfortunately, such paint surfaces can be easily contaminated by waterborne contaminants and by various greases and oils.

In this regard, the surface characteristics of a substrate can be altered by a variety of means, perhaps most readily by the application of a clear-coat layer. For example, the water permeability, dirt adherence resistance, wettability, and clarity properties of materials can be modified by suitable treatment of their surface. A number of compositions for altering the surface properties of substrates have been developed. Water repellant, oil repellent, stain resistant, anti-microbial, anti-static, anti-fog, anti-scratch and water absorptive surface treatments and coatings are well known commercial products.

Accordingly, there is a need for compositions that produce water repelling and/or oil repelling surface that can resist spoilage from various environmental contaminants.

SUMMARY

In at least one embodiment, the present invention solves one or more problems of the prior art by providing a coating composition that can form a coating that is hydrophilic, hydrophobic or omniphobic depending on the grade of silica that is used. The coating composition includes a fumed silica present in an amount from about 2 to 12 weight percent of the total weight of the coating composition and a resin in an amount from about 5 to 10 weight percent of the weight of fumed silica in the coating composition. The balance of the coating composition is a polar solvent. A coating formed from the hydrophobic paint composition can possess both chemical hydrophobicity and surface roughness to impart superhydrophobicity.

In another embodiment, a coated substrate formed form the coating compositions set forth herein is provided. The coated composition includes a substrate and a coating layer disposed over the substrate. The coating layer includes fumed silica and a resin. The fumed silica is present in an amount from about 70 to 99 weight percent of the total weight of the coating layer and the resin is present in an amount from about 30 to 1 weight percent of the total weight of the coating composition.

BRIEF DESCRIPTION OF THE DRAWINGS

FIG. 1 provides a schematic cross section of a substrate coated with the fumed silica compositions disclosed herein.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: all R groups (e.g. $R_i$ where i is an integer) include alkyl, lower alkyl, $C_{1-6}$ alkyl, $C_{6-10}$ aryl, or $C_{6-10}$ heteroaryl; single letters (e.g., "n" or "o") are 1, 2, 3, 4, or 5; percent, "parts of" and ratio values are by weight; the term "polymer" includes "oligomer," "copolymer," "terpolymer," irregular combinations of these, and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

Throughout this application, where publications are referenced, the disclosures of these publications in their entireties are hereby incorporated by reference into this application to more fully describe the state of the art to which this invention pertains.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. When one of these three terms is used, the presently disclosed and claimed subject matter can include the use of either of the other two terms.

The term "alkyl" as used herein means $C_{1-20}$, linear, branched, saturated or at least partially and in some cases fully unsaturated (i.e., alkenyl and alkynyl) hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Lower alkyl" refers to an alkyl group having 1 to about 8 carbon atoms (i.e., a $C_{1-8}$ alkyl), e.g., 1, 2, 3, 4, 5, 6, 7, or 8 carbon atoms. "Higher alkyl" refers to an alkyl group having about 10 to about 20 carbon atoms, e.g., 10, 11, 12, 13, 14, 15, 16, 17, 18, 19, or 20 carbon atoms.

The term "fumed silica" refers to a type of silica that is produced in a flame. Fumed silica includes microscopic droplets of amorphous silica that are fused into branched, chainlike, three-dimensional secondary particles. These secondary particles typically agglomerate into tertiary particles. Characteristically, fumed is very rough while having a low density.

The term "superhydrophilicity" as used in at least one embodiment refers to a coating or film having a contact angle less than 5 degrees at room temperature (i.e., 25° C.).

The term "superhydrophobicity" as used in at least one embodiment refers to a coating or film having a contact angle greater than 150 degrees at room temperature (i.e., 25° C.).

In an embodiment, a coating composition capable of forming a coating on a substrate with super hydrophilic properties is provided. The coating composition includes a polar solvent and fumed silica. Examples of polar solvents include water, methanol, ethanol, n-propanol, isopropanol, acetone, and combinations thereof. Typically, the fumed silica is present in an amount from about 2 to 12 weight percent of the total weight of the coating composition. In a refinement, the fumed silica is present in an amount from about 2 to 10 weight percent of the total weight of the coating composition. In still other refinements, the fumed silica is present in an amount equal or greater than, in increasing order of preference, 0.5, 1, 2, 3, 4, 5, or 6 weight percent of total weight of the coating composition and in an amount equal to or less than, in increasing order of preference, 15, 13, 10, 8, 6, 5, or 4 weight percent of total weight of the coating composition and in an amount equal to or less than. Fumed silica can be applied to a surface to impart a high level of surface roughness. By adjusting the surface chemistry of the fumed silica, the repellency of the surface to a variety of liquids and stains can be controlled.

In one variation of the coating composition, the fumed silica is unmodified fumed silica. In this context "unmodified" means that the fumed silica has not been chemically altered. In this variation, coatings on a substrate formed from the coating composition are hydrophilic typically having a contact angel less than 3°. This surface wets quickly to water, and provide a water sheeting effect. However, such a surface will not repel hydrophobic liquids such as oil.

In another variation of the coating composition, the fumed silica is fumed silica is coated with a surface modifying compound to be hydrophobic. In one refinement, the surface modifying compound is a non-polymeric compound. Examples of such non-polymeric compounds include, but are not limited to, non-polymeric hydrophobic compounds such as cyclic methylsiloxanes, polydimethylsiloxane, compounds having alkyl chains, and other hydrophobic molecules. The composition of this variation produces a coating having a surface with superhydrophobic properties (water contact angle>150° at 25° C.). Such a surface can only repel water and does not repel oil.

In a variation, the fumed silica is modified with a fluorinated compound to become omniphobic and therefore, to produce a surface that in omniphobic. Such surfaces will repel both water and oil. In one refinement the fluorinated compound is a non-polymeric compound. In another refinement, the fluorinated material is a fluoroalkylsilane. With fluoro-functionalized fumed silica, a surface with omniphobic properties can be obtained (water contact angle>150° at 25° C., hexadecane contact angle>130° at 25° C.). Such surface repels both water and hydrophobic liquids such as oil.

In a refinement of each of the coating compositions set forth above, the coating composition includes a small amount of a resin to improve stability. In a refinement, the resins include a component selected from the group consisting of polystyrene, polyacrylate, poly(methylacrylate), poly(methyl acrylamide), polyacrylonitrile, polyketone, polyester, polyolefin, polyphenol, silicone, polyethylene glycol, vinyl polymers, and combinations thereof. Typically, the resin is present in an amount from about 0.1 to 6 weight percent of the weight of fumed silica. In a refinement, the resin is present in an amount from about 0.2 to 5 weight percent. In still other refinements, resin is present in an amount equal or greater than, in increasing order of preference, 0.005, 0.05, 0.08, 0.1, 0.3, 0.5, or 1 weight percent of total weight of the coating composition and in an amount equal to or less than, in increasing order of preference, 8, 6, 5, 4, 2, 1, or 0.8 weight percent of total weight of the coating composition.

With reference to FIG. 1, a schematic cross section of a substrate coated with the coating compositions set forth above is provided. Coated substrate 10 includes substrate 12 and coating 14. Coating 14 is disposed over and typically contacts substrate 12. Substrate 12 can be either a painted or unpainted substrate. Such coatings can be hydrophobic, hydrophilic, or omniphobic as set forth below in more detail. Coating 14 can be formed by any number of methods known to those skilled in the art. Such methods include, but are not limited to, brushing, spraying, application with paint brushes, and rollers and the like. The fumed silica is typically present in the coating layer in an amount from about 70 to 99 weight percent of the total weight of the coating layer and the resin is present in an amount from about 30 to 1 weight percent of the total weight of the coating layer. In a refinement, the fumed silica is present in the coating layer in an amount from about 85 to 98 percent of the total weight of the coating layer and the resin is present in an amount from about 15 to 2 weight percent of the total weight of the coating layer. In another refinement, the fumed silica is present in the coating layer in an amount from about 90 to 95 percent of the total weight of the coating layer and the resin is present in an amount from about 10 to 5 weight percent of the total weight of the coating layer.

As set forth below, coating layer 14 can be hydrophilic, hydrophobic, or omniphobic depending on the type of fumed silica that is used. For example, when the fumed silica is unmodified, the coating layer has a hydrophilic surface.

When the fumed silica is coated with a surface modifying compound, the coating layer has a hydrophobic surface. A set forth above, the surface modifying compound can be a non-polymeric compound such as of cyclic methylsiloxanes, polydimethylsiloxane, compounds having alkyl chains, and other hydrophobic molecules, and combinations thereof. When the fumed silica is modified with a fluorinated compound, the coating layer has a hydrophilic surface. As set forth above, the fluorinated compound can a non-polymeric compound such as a fluoroalkylsilane.

The following examples illustrate the various embodiments of the present invention. Those skilled in the art will recognize many variations that are within the spirit of the present invention and scope of the claims.

Preparation of Superhydrophilic Surface:

Wacker HDK N20 or T40 (or other unmodified fumed silica) is suspended in water or ethanol at 2-10 wt % using either a grind mixer or ultrasonicator. After complete dispersion, the solution is brush/spray applied to either a painted or unpainted substrate and allowed to dry. Upon drying, the surface is now superhydrophilic and readily wets when water is applied. To enhance the durability of the coating, a small percentage of resin (5-10% relative to fumed silica) is added to aid in abrasion resistance, without negatively impacting superhydrophilicity.

Preparation of Superhydrophobic Surface:

Wacker HDK T17 or T18 (or other hydrophobically modified fumed silica) is dispersed in acetone using ultrasonication. After complete dispersion, the solution is brush/spray applied to either a painted or unpainted substrate and allowed to dry. Upon drying, the surface is now superhydrophobic and repels applied water at a contact angle>150°.

Synthesis of Fluoro Modified Fumed Silica:

A 5 wt % solution of Wacker HDK N20 (or T40 or other unmodified fumed silica) in ethanol is prepared. About 180 g of ethanol into 9 g of HDK N20. Disperse with the sonicator until completely dissolved. A NH$_4$OH solution (26BE or 28%) is added until pH is 10 with stirring. Typically, need to add around 20 drops of NH$_4$OH. The dispersion is sonicated for 10 minutes and then the pH rechecked. The pH should still be around 9.8 or higher. If not more ammonia is added and the pH rechecked. Dynasylan F8261 is added as follows. Two equivalents of fluorosilane to the number of surface silanol groups are added. In this example, the amount is about 6.1 g of F8261 for 9 g of HDK N20 (this will change based on the type of HDK since they have different surface areas). The mixture is sonicated for 10 minutes. The sample is then stirred overnight and then brush applied as a thin coat and the water beading checked. This process is repeated until the contact angle is greater than 150° for water. After reaction is complete, the solution is brush/spray applied to either a painted or unpainted substrate and allowed to dry. Upon drying, the surface is now omniphobic and repels applied water at a contact angle>150° and hexadecane at a contact angle greater than 130° at 25° C.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments, variations, and refinements may be combined to form further embodiments of the invention.

What is claimed is:

1. A coating composition comprising:
    a fumed silica present in an amount from about 2 to 12 weight percent of the total weight of the coating composition;
    a resin in an amount from about 5 to 10 weight percent of the weight of fumed silica in the coating composition; and
    a polar solvent being the balance.

2. The coating composition of claim 1 wherein the polar solvent is selected from the group consisting of water, methanol, ethanol, n-propanol, isopropanol, and combinations thereof.

3. The coating composition of claim 1 wherein the fumed silica in unmodified such that a coating formed from the coating composition has a hydrophilic surface.

4. The coating composition of claim 1 wherein the fumed silica is fumed silica is coated with a surface modifying compound to be hydrophobic.

5. The coating composition of claim 4 wherein the surface modifying compound is a non-polymeric compound.

6. The coating composition of claim 4 wherein the surface modifying compound is selected from the group consisting of cyclic methylsiloxanes, polydimethylsiloxane, compounds having alkyl chains, and other hydrophobic molecules, and combinations thereof.

7. The coating composition of claim 1 wherein the fumed silica is modified with a fluorinated compound such that a coating formed from the coating composition has a hydrophilic surface.

8. The coating composition of claim 7 wherein the fluorinated compound is a non-polymeric compound.

9. The coating composition of claim 7 wherein the fluorinated compound is a fluoroalkylsilane.

10. The coating composition of claim 1 wherein the resin includes a component selected from the group consisting of polystyrene, polyacrylate, poly(methylacrylate), poly(methyl acrylamide), polyacrylonitrile, polyketone, polyester, polyolefin, polyphenol, silicone, polyethylene glycol, vinyl polymers, and combinations thereof.

* * * * *